Patented Dec. 6, 1932

1,889,905

UNITED STATES PATENT OFFICE

CHARLES MARSHALL SAEGER, JR., OF BOWMANSTOWN, PENNSYLVANIA

CORE OR MOLD BINDER, COATING OR PASTE

No Drawing. Application filed February 17, 1930. Serial No. 429,225.

(GRANTED UNDER THE ACT OF MARCH 3, 1883, AS AMENDED APRIL 30, 1928; 370 O. G. 757)

My invention relates to a new and useful improvement in a core or mold binder, coating or paste for the production of castings.

This application is a continuation in part of my co-pending applications Serial Nos. 332,225 and 332,226, and those executed concurrently with this application and filed upon the same date.

In the said applications employing rubber as a constituent of, or binders, coatings or paste a substantial component of rubber is required to produce a given result both as to its binding or adhesive properties as well as to attain the requisite action or reaction due to the heat of the cast metals. Rubber is expensive and in order to produce the same or superior results with less rubber content, I have made substantial investigation and research; as a result of which I have discovered that with rubber alone as the binding ingredient of the mixture or composition recited in my aforesaid co-pending applications results in the compressive strengths in lbs. per square inch of the mold and/or core produced thereby which are stated in column 1 of the following table; such strength being attained in the period of time before testing stated in column 2 opposite each amount stated in column 1. Column 3 of the following table gives substantially the compressive strength in lbs. per square inch of the mold and/or core made in accordance with my present invention and attained in the time stated in column 2.

I have employed 75 parts of rubber to 25 parts of polymerized vinyl derivatives as dissolved and have employed 3½ parts by volume of this mixture to 40 parts of molding or core sand.

I have obtained satisfactory results by employing 1 per cent of polymerized vinyl derivatives as dissolved, and 99 per cent rubber. On the other hand, I have obtained satisfactory results by using 3½ parts of polymerized vinyl derivatives as dissolved to 40 parts of molding or core sand and intimately mixing the same.

With the above mixtures I have employed with satisfactory results 0.50 per cent benzidine on the basis of the rubber content in the mixture.

I have also used with satisfactory results in the mixture containing polymerized vinyl derivatives without rubber benzidine as low as 0.25 per cent on the basis of the polymerized vinyl derivatives content.

| Column 1 | Column 2 | Column 3 |
|---|---|---|
| 2.5 | At once | 2.7 |
| 5.0 | ½ hour | 5.2 |
| 5.7 | 1 | 6.65 |
| 7.0 | 1½ | 8.2 |
| 7.5 | 2 | 9.1 |
| 8.0 | 2½ | 10.3 |
| 8.8 | 3 | 10.5 |
| 8.75 | 3½ | 11.4 |
| 9.0 | 4 | 12.5 |
| 8.8 | 4½ | 12.7 |
| 9.0 | 5 | 13.7 |
| 8.1 | 24 | 15.2 |

In my present invention I have dissolved polymerized vinyl derivatives in a solvent well-known to those skilled in the art and of sufficient quantity to dissolve. This mixture I have used in varying proportions with satisfactory results. For instance, as a core binder, coating or paste, I have employed as high as equal parts of rubber and of polymerized vinyl derivatives. This mixture when used as a core binder I have employed 3½ parts by volume to 40 parts of molding or core sand and have intimately mixed the same together to form the surfaces of the mold or core adapted to be in contact with the cast metal.

Herein where the term, polymerized vinyl derivatives, is employed, it is intended, unless otherwise limited, to include the polymerization products of vinyl halides, vinyl chlor-acetate or vinyl acetate or other vinyl compounds which may be liquid or resemble more or less a resinous product. These resinous products may be prepared by the action of light, elevated temperature with or without suitable catalysts or by other means. They may be used alone or dissolved in suitable solvents, mixed in solution with other resins or with rubber. As rubber itself, is a vinyl derivative, commonly known as methyl di-vinyl, the vinyl resins I have used have the same desirable properties when mixed with sand or used as coating over sand surfaces.

The rubber content of this mixture is that which is substantially stated in my said co-pending applications. In this connection it should be borne in mind, however, that where lesser strength in the binder, coating or paste is desired, a lesser rubber constituent should be employed. For instance, in the last item of columns 2 and 3, if a compressive strength of substantially half of that given in the last item of column 3 is desired in the same mold or core which has dried for a period of 24 hours after being made, then substantially half of the rubber content will obtain satisfactory results with the use of a proportionate amount of polymerized vinyl derivatives. However, if a compressive strength of 15.2 lbs. per square inch of compressive strength is desired in a mold after being air dried for a period of 24 hours, the same amount of rubber constituent which produced such strength of 8.1 lbs. under like drying conditions will yield said desired strength when and if there be added to the mixture of the core binder, coating, or paste, the aforesaid mentioned parts of polymerized vinyl derivatives.

When a still greater strength is desired, one of the well-known vulcanizing accelerants together with sulphur may be employed in satisfactory mixture and the desired vulcanization obtained either by air drying or by the application of artificial heat.

Somewhat different results may be obtained with different molding sands but results are definitely attainable with knowledge of the characteristics of the molding sand.

My invention may, at will, be employed as a core binder and mixed with the sand or other particles comprising the great bulk of the mold or core, or the same may be applied as a coating, by brushing, spraying, or otherwise upon the surfaces of the mold or core adapted to come in contact with the cast surfaces, or the same may be used as a paste to cement together different portions of the core or mold.

The castings produced from such molds and/or cores are more satisfactory and economical than have heretofore been obtainable under commercial foundry practices.

With my present invention like conditions of strength may be readily obtained with substantially less rubber content.

The invention herein described may be manufactured and used by or for the Government of the United States for governmental purposes without the payment to me of any royalty thereon or therefor.

Having now so fully described my invention that others skilled in the art may therefrom make and use the same, what I claim and desire to secure by Letters Patent is:

1. A core binder, coating, or paste containing rubber and a polymerized vinyl derivative and adapted to be applied to a mold and subjected to decomposition by the heat of the metal to be cast in such mold or core.

2. A core binder, coating or paste for metal foundry practice containing rubber, polymerized vinyl derivative and solvents thereof adapted to air dry after being applied to an aggregate shaped into a mold or core, and the residue being adapted to lose its binding characteristic when subjected to the protracted heat of the metal to be cast in such mold or core.

3. A core binder, coating or paste containing a polymerized vinyl derivative and adapted to be applied to a mold and subjected to decomposition by the heat of the metal to be cast in such mold or core.

4. A core binder, coating, or paste containing substantially rubber and 1 per cent of polymerized vinyl derivatives on the basis of the rubber present therein and adapted to be applied to a mold and subjected to decomposition by the heat of the metal to be cast in such mold or core.

5. A core binder, coating, or paste containing rubber, 1 per cent of polymerized vinyl derivatives, on the basis of said rubber content and adapted to be applied to a mold and subjected to decomposition by the heat of the metal to be cast in such mold or core.

6. A mold or core containing rubber and a polymerized vinyl derivative.

7. A mold or core containing a polymerized vinyl derivative adapted to lose its binding effect upon the constituents of the mold or core by the heat of the casting cooling in the mold or core whereby the constituents of the mold or core may be readily separated from the casting.

8. A core binder, coating or paste containing a polymerized vinyl derivative and benzidine.

9. A mold or core containing rubber and 1 per cent of polymerized vinyl derivative on the basis of the rubber present therein.

10. The method of producing molds or cores including the steps of making the mold or core with a rubber and polymerized vinyl derivative content and drying the mold or core to the extent necessary to produce the strength desired therein.

11. The method of making a mold or core including the steps of providing the mold or core with a content of rubber and substantially 1 per cent of polymerized vinyl derivative on the basis of the rubber present therein, and drying the mold or core to the extent required to produce the desired strength.

12. The method of making the mold or core including the step of providing such mold or core with a content of rubber, a polymerized vinyl derivative, and sulphur.

13. The method of making the mold or core including the steps of providing such mold or core with a content of rubber, a polymerized vinyl derivative, and sulphur and vulcanizing accelerant, and vulcanizing same before using the mold or core.

14. The method of casting metals including the step of casting hot metal in contact with rubber and a polymerized vinyl derivative.

15. The method of casting metals including the step of casting hot metal in contact with rubber and 1 per cent of polymerized vinyl derivative on the basis of the rubber present.

16. The method of casting metals including the step of casting hot metal in contact with rubber and 1 per cent of polymerized vinyl derivative on the basis of therubber present, and sulphur sufficient normally to produce vulcanization of the rubber content.

CHARLES MARSHALL SAEGER, Jr.